United States Patent
Caton et al.

(10) Patent No.: US 9,231,705 B1
(45) Date of Patent: Jan. 5, 2016

(54) COMMUNICATION SYSTEM WITH QAM MODULATION

(71) Applicant: Emcore Corporation, Albuquerque, NM (US)

(72) Inventors: John Caton, Doylestown, PA (US); Daniel McGlynn, Albuquerque, NM (US)

(73) Assignee: Emcore Coporation, Alhambra, CA (US)

( * ) Notice: Subject to any disclaimer, the term of this patent is extended or adjusted under 35 U.S.C. 154(b) by 0 days.

(21) Appl. No.: 14/521,615

(22) Filed: Oct. 23, 2014

Related U.S. Application Data (63) Continuation-in-part of application No. 14/229,384, filed on Mar. 28, 2014, which is a continuation-in-part of application No. 11/932,374, filed on Oct. 31, 2007, now Pat. No. 8,718,484.

(51) Int. Cl.
*H04B 10/516* (2013.01)
*H04L 27/34* (2006.01)

(52) U.S. Cl.
CPC ........ *H04B 10/5161* (2013.01); *H04L 27/3472* (2013.01)

(58) Field of Classification Search
CPC ............ H04L 27/0008; H04L 27/2637; H04L 25/4902; H04L 27/34; H04L 2025/03414; H04L 27/362; H04L 1/0003; H04L 27/3472; H04B 10/5161
USPC ......... 375/295, 259, 222, 298, 300, 302, 309, 375/260, 261, 268, 269, 271, 279
See application file for complete search history.

(56) References Cited

U.S. PATENT DOCUMENTS

| | | |
|---|---|---|
| 5,430,569 A | 7/1995 | Blauvelt et al. |
| 6,252,693 B1 | 6/2001 | Blauvelt |
| 6,445,476 B1 | 9/2002 | Kahn et al. |
| 6,535,315 B1 | 3/2003 | Way et al. |
| 6,545,785 B1 | 4/2003 | Heflinger et al. |
| 6,556,327 B1 | 4/2003 | Ohya et al. |
| 6,559,994 B1 | 5/2003 | Chen et al. |
| 7,603,037 B2 | 10/2009 | Sayyah |
| 8,718,484 B2 | 5/2014 | Dallesasse et al. |
| 2002/0067883 A1 | 6/2002 | Lo |
| 2002/0101640 A1 | 8/2002 | Snawerdt |
| 2002/0129379 A1 | 9/2002 | Levinson et al. |
| 2003/0198478 A1 | 10/2003 | Vrazel et al. |
| 2005/0025504 A1 | 2/2005 | Huang et al. |
| 2006/0085727 A1* | 4/2006 | Azenkot et al. ............... 714/792 |
| 2006/0210282 A1 | 9/2006 | Iannelli |
| 2007/0206961 A1 | 9/2007 | Iannelli |
| 2008/0273874 A1 | 11/2008 | Ramachandran et al. |
| 2012/0321007 A1 | 12/2012 | Feher |
| 2013/0089340 A1 | 4/2013 | Huang et al. |
| 2013/0094013 A1 | 4/2013 | Hovis et al. |
| 2013/0308060 A1 | 11/2013 | Fay |

OTHER PUBLICATIONS

U.S. Appl. No. 14/229,384, filed Mar. 28, 2014, McGlynn.

* cited by examiner

*Primary Examiner* — Vineeta Panwalkar
(74) *Attorney, Agent, or Firm* — David S Alavi (57) ABSTRACT

A data communications network in which a first information-containing radio frequency signal input is applied to a modulation circuit for modulating a carrier wave with the signal input, and a second information-containing radio frequency signal is applied to at the modulation circuit for modulating least one of the constellation points of the first modulation.

18 Claims, 7 Drawing Sheets

Circular 16-QAM

FIG. 2C

Circular 4-QAM

FIG. 2A

Circular 8-QAM

FIG. 2B

Rectangular 64-QAM

COMMUNICATION SYSTEM WITH QAM MODULATION

REFERENCE TO RELATED APPLICATIONS

This application is a continuation-in-part of U.S. patent application Ser. No. 14/229,384 filed Mar. 28, 2014, which in turn is a continuation-in-part of U.S. patent application Ser. No. 11/932,374 filed on Oct. 31, 2007, now U.S. Pat. No. 8,718,484, each of which is incorporated herein by reference in its entirety.

BACKGROUND

This disclosure relates to a data communications system for analog or digital signals, and in particular to systems using quadrature amplitude signal modulation. More particularly, the disclosure relates to the encoding of more than one information-containing signal source or channel with one source using a QAM modulation technique and the transmission of both encoded channels substantially simultaneously over the same communications link.

Although high throughput telecommunications networks do not constrain the size of the optical transceiver, optical transceivers for data center applications that use the Ethernet data communications protocol generally conform to IEEE 802.3 standard specifications and MSA form factors. Ethernet (the IEEE 802.3 standard) is the most popular data link network protocol. The Gigabit Ethernet Standard (IEEE 802.3) was released in 1998 and included both optical fiber and twisted pair cable implementations.

The 10 Gb/sec Ethernet standard (IEEE 802.3 ae) was released in 2002 with both optical fiber and twisted pair cabling. The 10 Gigabit Ethernet Standard specifications are set forth in the IEEE 802.3 ae supplement to the IEEE 802.3 Ethernet Standard are currently the highest data rate that has been standardized under the IEEE 802.3 framework. The supplement extends the IEEE 802.3 protocol and MAC specification therein to an operating speed of 10 Gb/s. Several Physical Coding Sublayers known as 100GBASE-X, 10GBASE-R and 10-GBASE-W are specified, as well as a 10 Gigabit Media Independent Interface (XGMII), a 10 Gigabit Attachment Unit Interface (XAUI) and a 10 Gigabit Sixteen-Bit Interface (XSBI) and management Regardless of whether the system provides for one optical channel, or a WDM system with multiple optical channels, there is interest in increasing the information carrying capacity of an optical channel. Although various techniques such as PAM and QAM are known in the prior art, prior to the parent applications, it has not been known to utilize the jitter or inherent chirp associated with the transmitter to carry an additional information channel or bit.

OVERVIEW

Objects of the Disclosure

It is an object of the disclosure to provide a modulation technique that encodes two discrete information-containing signal sources or channels into a signal transmission constellation that utilizes phase and quadrature modulation.

It is an object of the disclosure to provide a signal encoding technique that encodes a standard quadrature amplitude modulation signal constellation point with a second signal source so that two discrete information-containing signal sources or channels are encoded into a signal transmission constellation point.

It is an object of the disclosure to provide a modulation technique that encodes a low data rate information-containing signal sources or channel into a high data rate signal transmission constellation that utilizes phase and/or quadrature modulation.

It is an object of the disclosure to provide a modulation technique that encodes a low data rate control signal into a high data rate information-containing signal transmission.

It is an object of the disclosure to provide a modulation technique that encodes one or more first information-containing signal sources or channels into a first signal constellation, and one or more second information-containing signal sources or channels into a scaled replica of a second signal constellation at a location of only one of the signal transmission constellation points of the first signal constellation so as to form a composite signal constellation.

It is another object of the disclosure to provide a dual channel signal encoding and modulation technique that encodes a single selected standard quadrature amplitude modulation signal constellation point of a first signal constellation with a low data rate second signal source by slightly varying the phase and/or amplitude modulation of the single selected signal constellation point so that such variation encodes the data of the second signal source into a scaled replica of a second signal constellation at the location of the single selected signal transmission constellation point.

It is another object of the disclosure to provide digital watermarking in a quadrature amplitude modulation data communications signals.

It is an object of the disclosure to provide a modulation technique that encodes a first information-containing signal sources or channels into a first signal constellation, and a second information-containing signal sources or channels into a second signal constellation, wherein the set of first and second signal constellation points constitute a third signal constellation which is a QAM-N signal constellation, wherein N is a power of 2.

It is an object of the disclosure to provide a modulation technique that encodes one or more first information-containing signal sources or channels into a first signal constellation, and one or more second information-containing signal sources or channels into a second signal constellation, wherein the set of first and second signal constellation points are offset by an appropriate Euclidean distance so that both the first and second channels can be reliably demodulated at the remote receiver.

It is an object of the disclosure to provide a modulation technique that encodes a first information-containing signal sources or channels into a first signal constellation at a first power level, and a second information-containing signal sources or channels into a second signal constellation at as second power level different from the first power level, wherein the set of first and second signal constellation points can be distinguished at the remote receiver by comparison of the power levels of the received signal.

It is an object of the disclosure to provide a data communications technique that performs a logical combination of a first information-containing digital signal sources or channels with a second information-containing digital signal sources or channels to produce a third digital data stream which is encoded into a signal constellation, and transmitting the signal constellation over a communication link to a remote receiver, where the signal constellation is decoded into the first and second information-containing signal sources.

Some implementations or embodiments may achieve fewer than all of the foregoing objects.

SUMMARY OF THE INVENTION

Briefly, and in general terms, the present disclosure provides a data communications system including a transmitter for generating a composite modulated signal from first and second independent information-containing signals for transmission over a communications link to a remote receiver where the first and second information-containing signals are to be reconstructed, including a first information-containing signal source having a first data rate encoded into a first signal constellation including a plurality of first constellation points each point representing a symbol; and a second information-containing signal source having a second lower data rate than the first information-containing single source and encoded into a second signal constellation including a set of a plurality of second constellation points spaced apart from the first constellation points.

In another aspect, the present disclosure provides a data communications system transmitter for generating a composite modulated signal from first and second independent information-containing signals for transmission over a communications link to a remote receiver where the first and second information-containing signals are to be reconstructed, including a first information-containing signal source having a data rate encoded into a first signal constellation including a plurality of first constellation points; a second information-containing signal source having a lower data rate than the first information-containing signal source encoded into a scaled replica of a second signal constellation including a plurality of second constellation points at a location of a single selected constellation point of the first signal constellation so that transmission of the symbol corresponding to the single selected constellation point of the first signal constellation (i.e., the designated carrier symbol) entails the transmission of a symbol of the second information-containing signal source.

In another aspect, the present disclosure provides a data communications system transmitter for generating a composite modulated signal from first and second independent information-containing signals for transmission over a communications link to a remote receiver where the first and second information-containing signals are to be reconstructed, including a first information-containing signal source having a data rate encoded into a first signal constellation including a plurality of first constellation points; a second information-containing signal source having a lower data rate than the first information-containing signal source encoded into a scaled replica of a second signal constellation including a plurality of second constellation points at a location of a single selected constellation point of the first signal constellation so transmission of the symbol corresponding to single selected constellation point of the first signal constellation (i.e., the designated carrier symbol) entails the transmission of a symbol of the second information-containing signal source.

In another aspect, the present disclosure provides a transmitter for generating a composite modulated signal from first and second independent information-containing signals for transmission over a communications link to a remote receiver where the first and second information-containing signals are to be reconstructed, including a summing or combining component to combine the first information-containing signal source with the second information-containing signal source to form a composite third signal, wherein the second signal has a lower data rate than the first information-containing signal source, and the composite third signal is encoded into a signal constellation including a plurality of constellation points.

In another aspect, the present disclosure provides a transmitter for generating a composite modulated signal from first and second independent information-containing signals for transmission over a communications link to a remote receiver where the first and second information-containing signals are to be reconstructed, including a summing or combining component to combine the first information-containing signal source with the second information-containing signal source to form a composite third signal, wherein the second signal has a lower data rate than the first information-containing signal source, and the composite third signal is encoded into a signal constellation including a plurality of constellation points.

In some embodiments, the communications link is a wired radio frequency wireless radio frequency, or an optical fiber link.

In some embodiments, the first signal constellation is a QAM constellation.

In some embodiments, the second signal constellation is a PSK modulation.

In some embodiments, the second signal constellation is an ASK modulation.

In some embodiments, the second signal constellation is a QAM constellation.

In some embodiments, the first signal constellation is a QAM-M constellation, and the second signal constellation is a QAM-N constellation, where M and N are two different powers of 2, with M greater than N.

In some embodiments, the first signal constellation is a first set of constellation points in a QAM-M constellation, and the second signal constellation is a second set of constellation points in an QAM-N constellation, wherein the combination of the first and second set of constellation points form a QAM-P constellation, where M, N and P are different integers, and M is greater than N, and M plus N equals P.

In some embodiments, the transmitted carrier is a wireless RF signal.

In some embodiments, the transmitted carrier is an RF signal sent over a cable or wired electrical link.

In some embodiments, the transmitted carrier is an IEEE 802.3 link.

In some embodiments, the transmitted carrier is an IEEE 802.11 link.

In some embodiments, the transmitted carrier is a mobile or cellular telephone link.

In some embodiments, the transmitted carrier is a free space optical link.

In another aspect the present disclosure provides a method for data communication by generating a composite modulated signal from first and second independent information-containing signals for transmission over a communications link to a remote receiver, by encoding a first information-containing signal source having a first data rate into a first signal constellation including a plurality of first constellation points with each point representing a multi-bit data symbol; and encoding a second information-containing signal source having a second lower data rate than the first information-containing single source into a second signal constellation that overlaps with at least one signal constellation point of the first signal constellation so that the position of each of the set of second constellation points are slightly displaced from the at least one first constellation point so that at the remote receiver the position of the second constellation points appear to be as a result of noise in the transmission associated with the receipt of the at least one first constellation point.

In another aspect the present disclosure provides a method for data communication by generating a composite modulated signal from first and second independent information-containing signals for transmission over a communications link to a remote receiver, by encoding a first information-containing signal source having a first data rate into a first signal constellation including a plurality of first constellation points with each point representing a multi-bit data symbol; and encoding a second information-containing signal source having a second lower data rate than the first information-containing single source into a second signal constellation that overlaps with at least one signal constellation point of the first signal constellation so that the position of each of the set of second constellation points are slightly displaced from the at least one first constellation point so that at the remote receiver the position of the second constellation points appear to be as a result of noise in the transmission associated with the receipt of the at least one first constellation point.

In another aspect the present disclosure provides a method for data communication by generating a composite modulated signal from first and second independent information-containing signals for transmission over a communications link to a remote receiver, by encoding a first information-containing signal source having a first data rate into a first signal constellation including a plurality of first constellation points with each point representing a multi-bit data symbol; and encoding a second information-containing signal source having a second lower data rate than the first information-containing single source into a second signal constellation that overlaps with at least one signal constellation point of the first signal constellation so that the position of each of the set of second constellation points are slightly displaced from the at least one first constellation point so that at the remote receiver the position of the second constellation points appear to be as a result of noise in the transmission associated with the receipt of the at least one first constellation point.

Some implementations of the present disclosure provide amplitude and frequency modulation of the output of a radio frequency transmitter to carry two independent information-containing signals.

Some implementations of the present disclosure may incorporate or implement fewer of the aspects and features noted in the foregoing summaries.

Additional aspects, advantages and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

GLOSSARY

"Amplitude-shift keying (ASK)" means a modulation technique in which only the amplitude of the carrier signal is changed.

"Carrier/interference ratio" means the ratio of the amplitude of the carrier signal to the amplitude of the peak interfering signal.

"Carrier-to-noise ratio" means the ratio of the amplitude of the carrier signal to the amplitude of the inherent system broadband Gaussian noise.

"Circular QAM constellation" means a constellation in which the constellation points are laid out along the circumference of one or more concentric circles.

"Constellation" means a representation of signals in a two dimensional graph in which one axis of the graph is a quadrature component and the other axis is an in-phase component, so that each constellation point on the graph is represented by the sum of two signal components that are 90° out of phase.

"Euclidean distance" means the distance between points on a two dimensional graph or a higher dimensional space that one would measure with a single straight line connecting the points.

"Metric distance" means the distance between points on a two dimensional graph or a higher dimensional space that one would measure according to a predetermined metric formula, examples being the Euclidean distance or a Hamming distance.

"Phase-shift keying (digital PSK)" means a special case of QAM, where the magnitude of the modulating signal is a constant, with only the phase varying.

"Quadrature amplitude modulation (QAM)" means a modulation technique in which both the amplitude and the phase of a carrier signal are varied.

"Rectangular QAM constellation" means a constellation in which the constellation points of a QAM signal are laid out along the sides of one or more rectangles.

DETAILED DESCRIPTION OF THE PREFERRED EMBODIMENT(S)

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments nor the relative dimensions of the depicted elements, and are not drawn to scale.

The parent applications noted above relate to a data communications system for analog or digital signals, and the encoding of more than one information-containing signal source or channel onto a single carrier signal and the transmission of both encoded channels substantially simultaneously over the same communications link.

In particular, the parent applications described an embodiment of an optical transmission system with first and second RF signal input sources $RF_1$ and $RF_2$, respectively, such as a broadband signal including a plurality of distinct information-containing communications signals or channels. The $RF_1$ input is applied to RF conditioning circuitry such as a pre-distortion circuit. The pre-distortion circuit provides an output signal to a DC laser driver or control circuit, which is applied to the laser. The laser is current modulated, so that an amplitude modulated optical signal representing the $RF_1$, which is input to phase modulator.

The second RF signal input source $RF_2$, is applied directly to the phase modulator. In this one embodiment, the information-containing communication channels are divided into two groups: the first group containing channels 1 through M is applied to the laser to directly amplitude modulate the laser; and the second group of channels M+1 through N is applied to the phase modulator, to modulate the chirp of the laser. Since the amplitude modulation and the chirp or jitter modulation are independent, the result is that the resulting amplitude and jitter modulated optical signal output from the phase modulator will carry a N information-containing channels.

In one implementation of the above embodiment, the jitter modulated optical signal may be limited to carrying a single "control" channel, as opposed to carrying "data." The control channel may be used to transfer operational data concerning the transmitter or transceiver with which it is associated, or to provide instructions or commands to a remote module to which the communications link is attached, or error correction data associated with the data stream sent by the amplitude modulated optical signal.

Optical fiber transmission line 113 may be a long-distance link extending over several kilometers. In this case, line amplifiers such as EDFAs may be provided at spaced intervals along in the line in order to boost the signal to desired levels. At the receiver 114, an amplifier (not shown) may also be provided to boost the incoming optical signal. The boosted signal is then applied to a photodector and demodulated at the receiver 114 to an electrical signal, which represents the original video or data signal at line 115.

In a second embodiment described in the parent application, the information-containing communications signal is a digital signal transferred as 8-bit bytes, and are divided into two groups: the first group containing bits 0 through 6 is applied a multiplexer or encoder to the laser to directly amplitude modulate the laser.

The second group, consisting solely of bit 7 of the 8-bit byte, is applied also to a suitable delay circuit, and then the phase modulator so that the optical signal modulated with bits 0-6 is phase modulated with bit 7. The resulting optical signal is amplitude modulated with bits 0-6, and chirp or phase modulated with bit 7. Since the amplitude modulation and the chirp or jitter modulation are independent, the result is that the amplitude and jitter modulated optical signal output at optical link 111 will carry an 8-bit information byte.

More generally, the present disclosure describes an arrangement in which first and second information containing signals are separately applied to form a transmitted data symbol in a digital signal processor. The digital signal processor forms the amplitude and phase modulation components of the transmitted symbol from the two independent source signals.

In normal quadrature amplitude modulation, a single information containing signal is encoded into a QAM symbol, which then is electrically implemented by appropriate amplitude and phase modulation of the carrier for each respective symbol. The present disclosure has two independent information containing signals, which separately and independently modulate the amplitude and phase, respectively, of the carrier. What is transmitted may appear to be a QAM symbol, but since the encodation is different a normal QAM decoder would not be able to decode the received signal into both signal sources. Rather, one must utilize a customized QAM symbol decoder such as a digital signal processor, to separate the amplitude and phase components into different constellation points, and examine each constellation point in greater detail to determine its data content. The symbol decoder functions to separate the two different channels, which represent the two independent source data streams, in order to intelligibly decode the data in each channel.

In still other embodiments utilizing QAM encoding and transmission, the first high data rate information-containing signal or channel may be encoded into QAM symbols, and the second low data rate information-containing signal may modulate the "jitter" associated with one or more of the QAM symbols which encodes the first information channel.

A brief summary of the basic phase and QAM modulation techniques can be illustrated here.

Figure 1A:
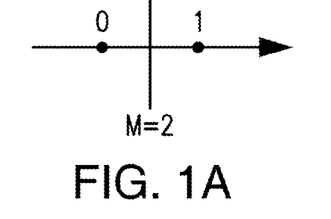
FIG. 1A is a representation of the phase shift keying (PSK) modulation with two phases.

FIG. 1A is a representation of the phase shift keying (PSK) modulation with two phases. The constellation point representing a "1" bit is to the right, and the point representing a "0" bit is to the left.

Figure 1B:
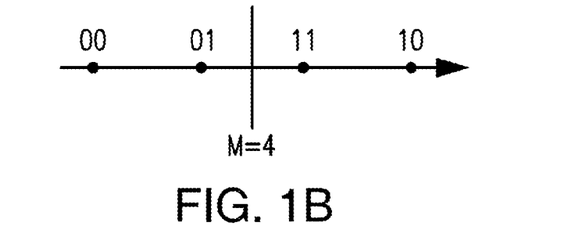
FIG. 1B is a representation of the phase shift keying (PSK) modulation with four phases.

FIG. 1B is a representation of the phase shift keying (PSK) modulation with four phases, which can encode four symbols, representing the two-bit sequences "00", "01", "11" and "10" respectfully.

Figure 1C:
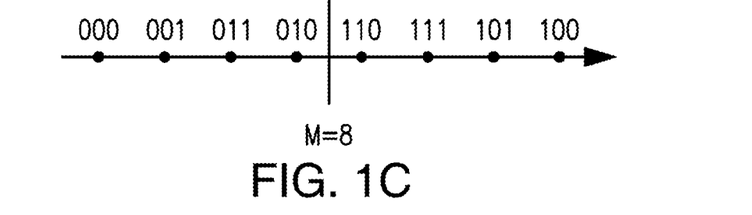
FIG. 1C is a representation of the phase shift keying (PSK) modulation with eight phases.

FIG. 1C is a representation of the phase shift keying (PSK) modulation with eight phases, which can encode eight symbols representing the three-bit sequences "000", "001", "011", "010", "110", "111", "101 and "100" respectively.

Figure 2A:
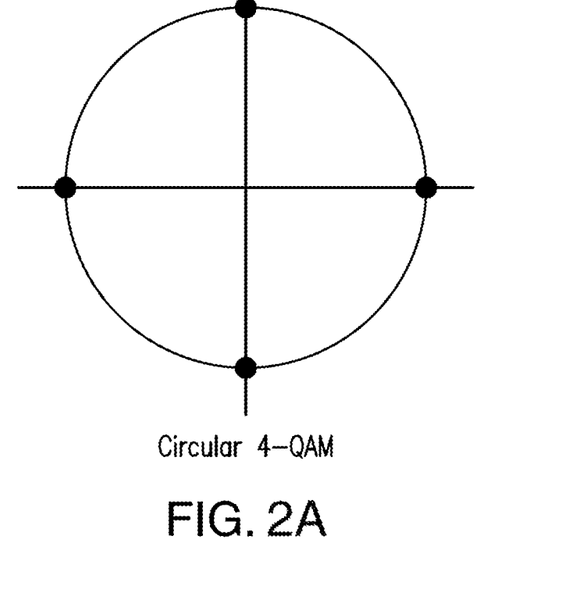
FIG. 2A is a graphical representation of a constellation depicting four constellation points, with each point representing a data symbol in an embodiment of quadrature amplitude modulation (QAM) known as circular 4-QAM.

FIG. 2A is a graphical representation of a constellation depicting four constellation points, with each point representing a data symbol in an embodiment of circular 4-QAM. The x-axis is the in-phase or "I" axis and the y-axis the quadrature or "Q" axis.

Figure 2B:
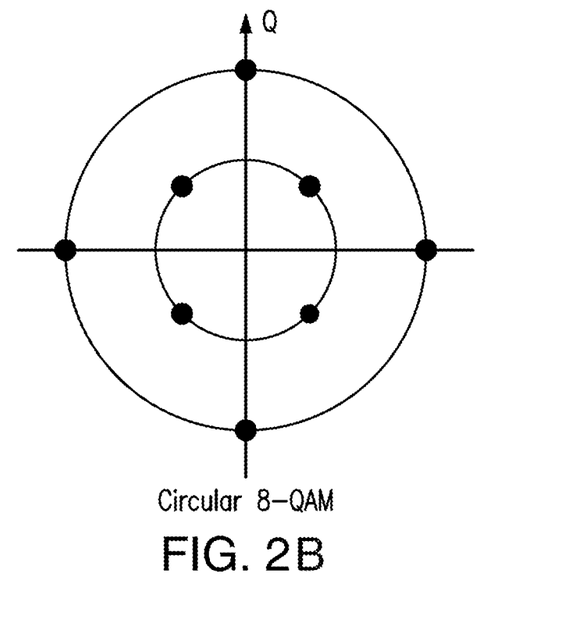
FIG. 2B is a graphical representation of a constellation depicting eight constellation points, with each point representing a data symbol in an embodiment of circular 8-QAM.

FIG. 2B is a graphical representation of a constellation depicting eight constellation points, with each point representing a data symbol in an embodiment of circular 8-QAM.

Figure 2C:
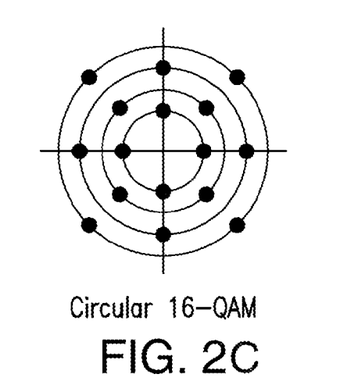
FIG. 2C is a graphical representation of a constellation depicting sixteen constellation points, with each point representing a data symbol in an embodiment of circular 16-QAM.
Figure 3:
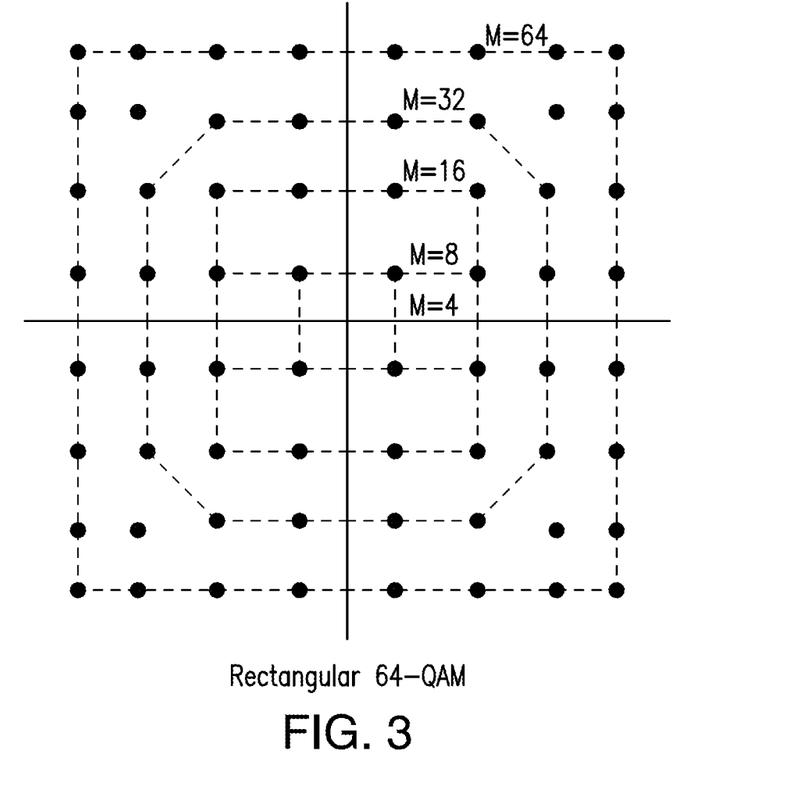
FIG. 3 is a graphical representation of a constellation depicting sixty-four constellation points, with each point representing a data symbol in an embodiment of rectangular 64-QAM.

FIG. 2C is a graphical representation of a constellation depicting sixteen constellation points, with each point representing a data symbol in an embodiment of circular 16-QAM.

Figure 4:
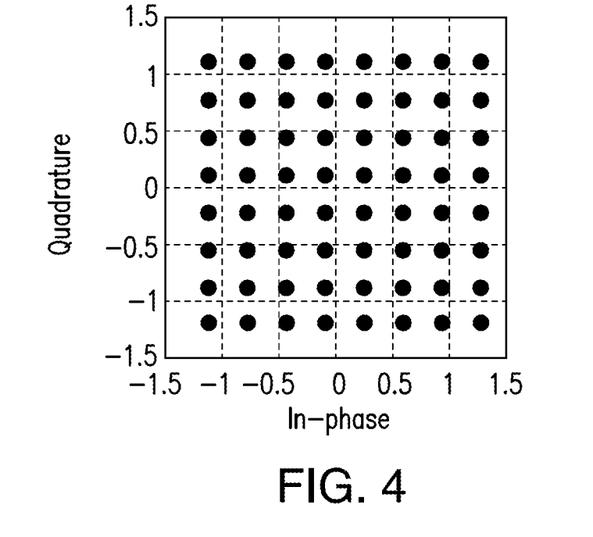
FIG. 4 is a graphical representation of the received signals over a period of time corresponding to the receipt of signals at the remote receiver corresponding to the transmission of signals encoded with the constellation of FIG. 3.
Figure 5:
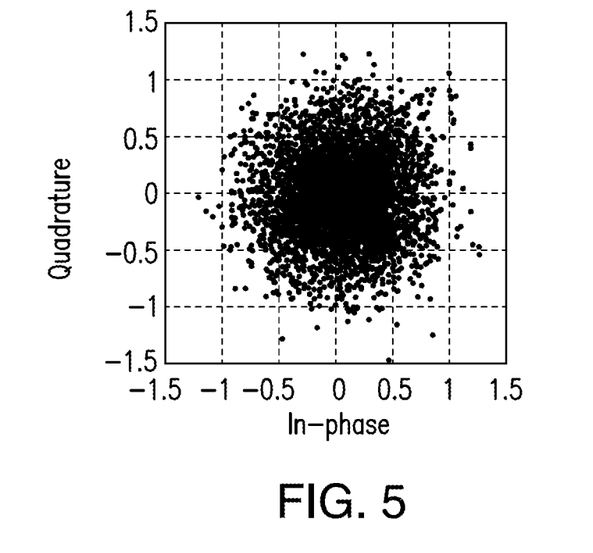
FIG. 5 is an enlargement of a single constellation point in the representation of FIG. 4.

FIG. 5 is an enlargement of a single constellation point in the representation of FIG. 4 to illustrate with a single dot a received signal mapped on the I/Q graph, and the aggregate of multiple received signals, each having slightly different I and Q values due to noise and other distortion effects being spread out from the nominal center at (0,0).

Figure 6:
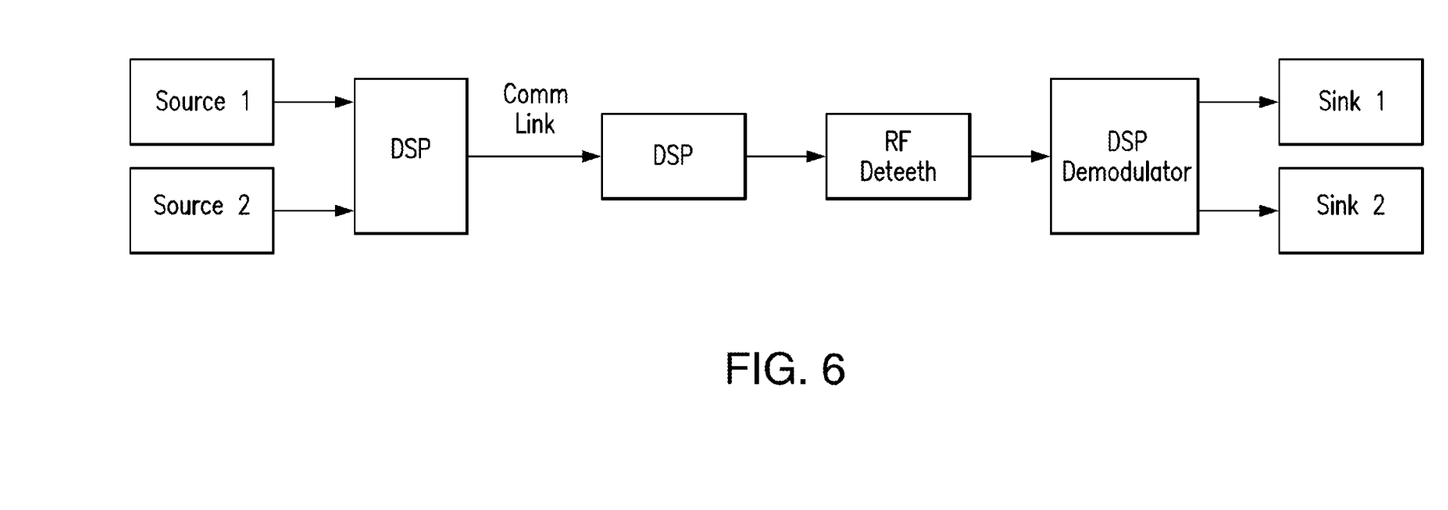
FIG. 6 is a block diagram of an implementation of a communication system according to the present disclosure.

FIG. 6 is a block diagram of an implementation of a communication system according to the present disclosure. In an embodiment of a data communications system with first and second RF signal input sources $RF_1$ and $RF_2$, respectively. $RF_1$ may be a broadband signal including a plurality of distinct information-containing communications signals or channels, such as a cable television signal for transmission from a head end to stations connected on the network.

Figure 7A:
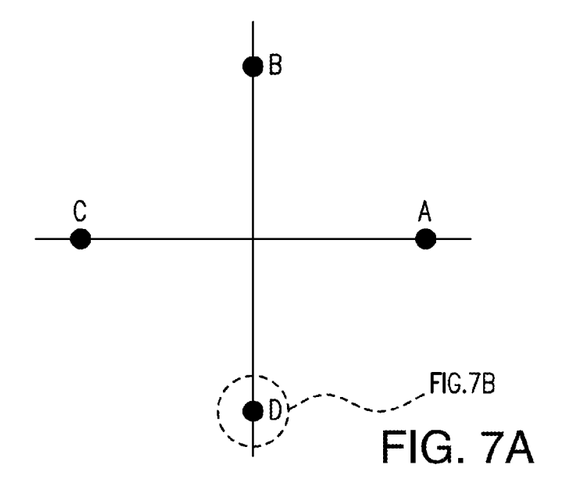
FIG. 7A is a depiction of the constellation of FIG. 2A with data symbols A, B, C and D being designated.

FIG. 7A is a depiction of the constellation of FIG. 2A with data symbols A, B, C and D being designated.

Figure 7B:
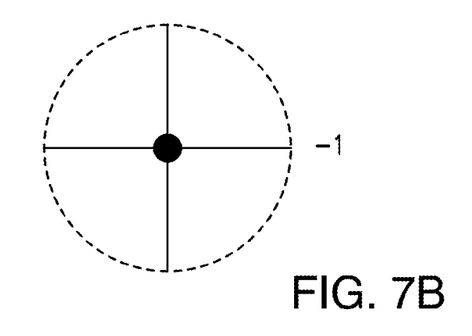
FIG. 7B is an enlargement of the received signal of data symbol D over a period of time at the remote receiver.

FIG. 7B is an enlargement of the received signals of data symbol D of FIG. 7A over a period of time at the remote receiver. In this embodiment, the data "0" and "1" of the second channel are encoded to lie at the periphery of their distribution circle representing the noisy signal. In this example the symbol D serves as the designated carrier symbol within the first signal for carrying symbols of the second signal.

Figure 7C:
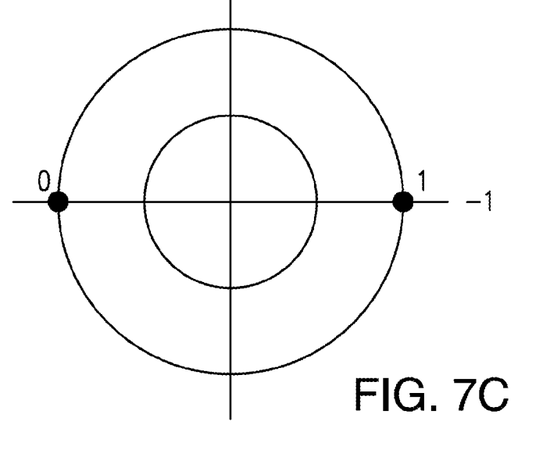
FIG. 7C is a graphical representation of the encoding of the second signal according to a scaled replica of the second signal constellation of the PSK modulation of FIG. 1A, centered on the quadrature and in-phase coordinates of data symbol D of the first signal constellation of the QAM modulation of FIG. 7A, according to the present disclosure, with the received signal of 7B also depicted.

FIG. 7C is a graphical representation of the encoding of the second signal according to a scaled replica of the second signal constellation of the PSK modulation of FIG. 1A, centered on the quadrature and in-phase coordinates of data symbol D of the first signal constellation of the QAM modulation of FIG. 2A, according to the present disclosure, with the received signal of 7B also depicted, but with "0" and "1" encoded to lie along the in-phase axis so as to form a composite signal constellation.

Figure 8A:
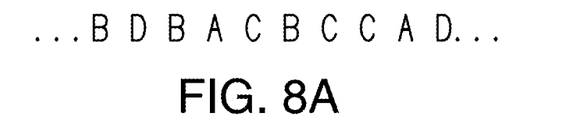
FIG. 8A is a representation of a signaling sequence of data using four symbols, designated A, B, C, and D; to illustrate a first information-containing channel.

FIG. 8A is a representation of a signaling sequence of data using four symbols, designated A, B, C, and D to illustrate a data sequence in a first information-containing channel.

Figure 8B:
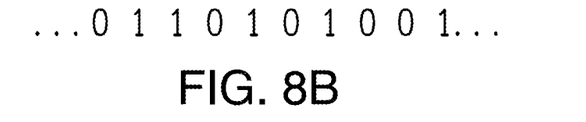
FIG. 8B is a representation of a signaling sequence of data using 0 and 1 binary digits, to illustrate a second information-containing channel.

FIG. 8B is a representation of a signaling sequence of data using 0 and 1 binary digits, to illustrate data sequence in a second information-containing channel.

Figure 8C:
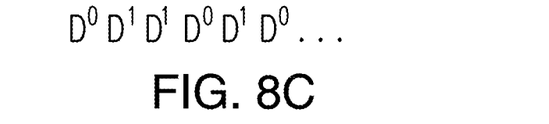
FIG. 8C is a representation of a signaling sequence in one embodiment of the present disclosure in which the "D" symbol of the first information containing channel (i.e., the designated carrier symbol of the first signal) is modulated with the signaling sequence of FIG. 8B (i.e., the symbols of the second signal)

FIG. 8C is a representation of a signaling sequence in one embodiment of the present disclosure in which the "D" symbol of the first information containing channel, and only the "D" symbol (i.e., the designated carrier symbol of the first signal), is modulated with the signaling sequence of FIG. 8B (i.e., the symbols of the second signal). Superscripts are used to designate the binary data sequence from FIG. 8B.

Figure 9A:
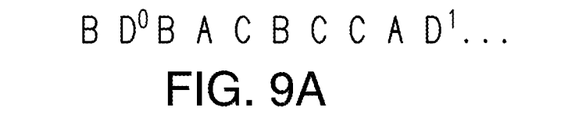
FIG. 9A is a representation of a composite signaling sequence of data of FIG. 8A (representing the first signal) with the modulated D symbols of FIG. 8C (representing the second signal), with the first two D symbols being illustrated.

FIG. 9A is a representation of a composite signaling sequence of data of FIG. 8A (representing the first signal) with the modulated D symbols of FIG. 8C (representing the second signal), with the first two D symbols being illustrated for simplicity.

Figure 9B:
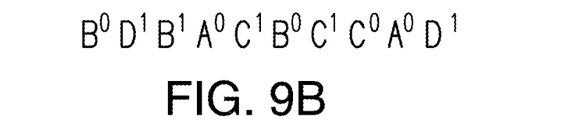
FIG. 9B is a representation of a signaling sequence in a second embodiment of the present disclosure in which each of the symbols of the first information containing channel is modulated with the signaling sequence of FIG. 8B.

FIG. 9B is a representation of a signaling sequence in a second embodiment of the present disclosure in which each of the symbols of the first information containing channel (that is, symbols A, B, C and D) is modulated with the signaling sequence of FIG. 8B.

In one implementation of the above embodiment, the second signal source or channel may be limited to representing a single "control" channel, as opposed to carrying "data." The control channel may be used to transfer operational data concerning the transmitter or transceiver with which it is associated, or to provide instructions or commands to a remote receiver to which the communications link is attached, or error correction data associated with the data stream sent by the modulated signal.

Another embodiment of the present invention is to utilize the first and second information containing signals to separately apply to the amplitude and phase modulation components of a transmitted symbol. In normal quadrature amplitude modulation, a single information containing signal is encoded into a QAM symbol, which then is electrically implemented by appropriate amplitude and phase modulation of the carrier for each respective symbol. The present embodiment has two independent information containing signals, which separately and independently modulate the amplitude and phase, respectively, of the carrier. What is transmitted may appear to be a QAM symbol, but since the encodation is different a normal QAM decoder would not be able to decode the received signal into the source data. Rather, one must utilize a customized QAM symbol decoder to separate the amplitude and phase components into two different channels, which represent the two independent source data streams, in order to intelligibly decode the data.

In still other embodiments utilizing QAM encoding and transmission, the first high data rate information-containing signal or channel may be encoded into QAM symbols, and the second low or data rate information-containing signal may modulate either the "jitter" amplitude or the phase associated with one or more of the QAM symbols which encodes the first information containing signal.

Various aspects of the techniques and apparatus of the present invention may be implemented in digital circuitry, or in computer hardware, firmware, software, or in combinations of them. Circuits of the invention may be implemented in computer products tangibly embodied in a machine-readable storage device for execution by a programmable processor, or on software located at a network node or web site which may be downloaded to the computer product automatically or on demand. The foregoing techniques may be performed by, for example, a single central processor, a multi-processor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

It will be understood that each of the elements described above, or two or more together, also may find a useful application in other types of constructions differing from the types described above.

While the invention has been illustrated and described as embodied in an optical transmission system, it is not intended to be limited to the details shown, since various modifications and structural changes may be made without departing in any way from the spirit of the present invention. Accordingly, other implementations are within the scope of the claims.

What is claimed is:

1. A transmitter for generating a composite modulated signal from first and second independent information-containing signals for transmission over a communications link to a remote receiver where the first and second information-containing signals are to be reconstructed, the transmitter comprising:
    (a) a first information-containing signal source characterized by a first data rate and encoding onto a first signal constellation symbols of the first information-containing signal according to a first modulation scheme, the first modulation scheme mapping each one of the symbols of the first signal onto a corresponding one of a plurality of constellation points of the first signal constellation, each one of the constellation points of the first signal constellation representing a corresponding one of a first plurality of symbols employed in the first signal;
    (b) a second information-containing signal source characterized by a second data rate, lower than the first data rate, and encoding onto a second signal constellation symbols of the second information-containing signal according to a second modulation scheme, the second modulation scheme mapping each one of the symbols of the second signal onto a corresponding one of a plurality of constellation points of the second signal constellation, each one of the constellation points of the second signal constellation representing a corresponding one of a second plurality of symbols employed in the second signal; and
    (c) a processor operatively coupled to the first and second signal sources and arranged to encode onto a composite signal constellation the symbols of the first and second signals according to a composite modulation scheme, wherein the processor is arranged so that:
    (d) the composite signal constellation includes all constellation points of the first signal constellation except for one omitted constellation point, the omitted constellation point corresponding to a designated carrier symbol among the first plurality of symbols;
    (e) the composite signal constellation includes, at a location of the omitted constellation point, a scaled replica of the second signal constellation;
    (f) the composite modulation scheme (i) maps each one of the symbols of the first signal, except for the designated carrier symbol, onto a corresponding one of the constellation points of the first signal constellation included in the composite signal constellation, (ii) maps the designated carrier symbol of the first signal onto one of the constellation points of the replica of the second signal constellation included in the composite signal constellation, and (iii) maps each one of the symbols of the second signal onto a corresponding one of the constellation points of the replica of the second signal constellation included in the composite signal constellation;
    (g) each one of the constellation points of the first signal constellation included in the composite signal constellation represents a corresponding one of the first plurality of symbols, except for the designated carrier symbol; and
    (h) each symbol of the second signal is mapped onto the corresponding constellation point of the replica of the second signal constellation only when the designated carrier symbol of the first signal is encoded onto the composite signal constellation, so that each one of the constellation points of the replica of the second signal constellation represents both (i) a corresponding one of the second plurality of symbols and (ii) the designated carrier symbol of the first plurality of symbols.

2. The transmitter of claim 1 wherein (i) each one of the constellation points of the first signal constellation included in the composite signal constellation represents a corresponding one of the first plurality of symbols, except for the designated carrier symbol, in accordance with the first modulation scheme, and (ii) each one of the constellation points of the replica of the second signal constellation included in the composite signal constellation represents one of the symbols of the second signal in accordance with the second modulation scheme.

3. The transmitter of claim 2 wherein the first signal constellation is a Quadrature Amplitude Modulation (QAM) constellation.

4. The transmitter of claim 2 wherein the second signal constellation is a Phase Shift Keying (PSK) modulation or a Quadrature Amplitude Modulation (QAM) modulation.

5. The transmitter of claim 2 wherein a metric distance within the composite signal constellation between any one of the constellation points of the replica of the second signal constellation and the location of the omitted constellation point is equal to or greater in magnitude than a noise magnitude at the remote receiver of the signal associated with the omitted constellation point of the first signal constellation.

6. The transmitter of claim 5 wherein the metric distance is a Hamming or Euclidean distance.

7. The transmitter of claim 2 wherein the first signal source is arranged so as to apply to the processor a first information-containing radio frequency signal representative of the first signal for modulating a carrier wave with the first information-containing radio frequency signal input to form the constellation points of the first signal constellation, and a second information-containing radio frequency signal representative of the second signal for modulating the carrier wave associated with the first signal constellation with the second information-containing signal so as to form constellation points of the replica of the second signal constellation at the location of the omitted constellation point.

8. The transmitter of claim 7 wherein the first signal constellation is a Quadrature Amplitude Modulation (QAM) constellation, and the second signal constellation is either a Phase Shift Keying (PSK) modulation or a Quadrature Amplitude Modulation (QAM) modulation.

9. The transmitter of claim 2 further comprising a digital signal processor coupled to the first and said second signal sources to produce the first and second signal constellations in a radio frequency signal for transmission over a wired, radio frequency wireless, or optical fiber communications link.

10. The transmitter of claim 9, further comprising a receiver coupled to the communications link, the receiver including a digital signal processor for demodulating the radio frequency signal.

11. The transmitter of claim 1 wherein the communications link is a wired, radio frequency wireless, or optical fiber link.

12. The transmitter of claim 1 wherein the communications link is a wired or wireless radio frequency communications link.

13. A method for data communication by generating a composite modulated signal from first and second independent information-containing signals for transmission over a communications link to a remote receiver, the method comprising:
  (a) encoding onto a first signal constellation symbols of the first information-containing signal according to a first modulation scheme, the first modulation scheme mapping each one of the symbols of the first signal onto a corresponding one of a plurality of constellation points of the first signal constellation, each one of the constellation points of the first signal constellation representing a corresponding one of a first plurality of symbols employed in the first signal, the first signal being characterized by a first data rate;
  (b) encoding onto a second signal constellation symbols of the second information-containing signal according to a second modulation scheme, the second modulation scheme mapping each one of the symbols of the second signal onto a corresponding one of a plurality of constellation points of the second signal constellation, each one of the constellation points of the second signal constellation representing a corresponding one of a second plurality of symbols employed in the second signal, the second signal being characterized by a second data rate that is lower than the first data rate; and
  (c) using a processor operatively coupled to respective sources of the first and second signal, encoding onto a composite signal constellation the symbols of the first and second signals according to a composite modulation scheme,
  wherein:
  (d) the composite signal constellation includes all constellation points of the first signal constellation except for one omitted constellation point, the omitted constellation point corresponding to a designated carrier symbol among the first plurality of symbols;
  (e) the composite signal constellation includes, at a location of the omitted constellation point, a scaled replica of the second signal constellation;
  (f) the composite modulation scheme (i) maps each one of the symbols of the first signal, except for the designated carrier symbol, onto a corresponding one of the constellation points of the first signal constellation included in the composite signal constellation, (ii) maps the designated carrier symbol of the first signal onto one of the constellation points of the replica of the second signal constellation included in the composite signal constellation, and (iii) maps each one of the symbols of the second signal onto a corresponding one of the constellation points of the replica of the second signal constellation included in the composite signal constellation;
  (g) each one of the constellation points of the first signal constellation included in the composite signal constellation represents a corresponding one of the first plurality of symbols, except for the designated carrier symbol; and
  (h) each symbol of the second signal is mapped onto the corresponding constellation point of the replica of the second signal constellation only when the designated carrier symbol of the first signal is encoded onto the composite signal constellation, so that each one of the constellation points of the replica of the second signal constellation represents both (i) a corresponding one of the second plurality of symbols and (ii) the designated carrier of the first plurality of symbols.

14. The method of claim 13 wherein the first signal constellation is a Quadrature Amplitude Modulation (QAM) constellation.

15. The method of claim 13 wherein the second signal constellation is an Amplitude Shift Keying (ASK) or Phase Shift Keying (PSK) modulation.

16. The method of claim 13 wherein a metric distance within the composite signal constellation between any one of the constellation points of the replica of the second signal constellation and the location of the omitted constellation point is equal to or greater in magnitude than a noise magnitude at the remote receiver of the signal associated with the omitted constellation point of the first signal constellation.

17. The method of claim 13 wherein the encoding of parts (a) and (b) is performed by a digital signal processor.

18. The method of claim 13 further comprising transmitting the composite modulated signal over the communications link, wherein the communications link is a wired or wireless radio frequency communications link.

* * * * *